US012321644B2

(12) United States Patent
Lee

(10) Patent No.: US 12,321,644 B2
(45) Date of Patent: Jun. 3, 2025

(54) MEMORY SHARING ELECTRONIC CIRCUIT SYSTEM AND EXTERNAL DEVICE CAPABLE OF STORING DATA IN HOST DEVICE

(71) Applicant: REALTEK SEMICONDUCTOR CORPORATION, Hsinchu (TW)

(72) Inventor: Yi-Chen Lee, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 93 days.

(21) Appl. No.: 18/098,723

(22) Filed: Jan. 19, 2023

(65) Prior Publication Data
US 2023/0266926 A1 Aug. 24, 2023

(30) Foreign Application Priority Data
Feb. 18, 2022 (TW) .................................. 111106072

(51) Int. Cl.
*G06F 3/06* (2006.01)
(52) U.S. Cl.
CPC ............ *G06F 3/067* (2013.01); *G06F 3/0607* (2013.01); *G06F 3/0617* (2013.01); *G06F 3/0652* (2013.01); *G06F 3/0656* (2013.01)
(58) Field of Classification Search
CPC ...... G06F 3/0607; G06F 3/061; G06F 3/0652; G06F 3/0656; G06F 3/0661; G06F 3/067
USPC ..................................... 710/52; 711/147–154
See application file for complete search history.

(56) References Cited

U.S. PATENT DOCUMENTS

| 9,063,919 | B2* | 6/2015 | Wang ...................... G06F 13/24 |
| 9,223,612 | B1* | 12/2015 | Feldman ............... G06F 3/0652 |
| 9,864,538 | B1* | 1/2018 | Johnson ................ G06F 3/0626 |
| 9,871,792 | B2* | 1/2018 | Enke ................. H04W 52/0209 |
| 10,193,886 | B2* | 1/2019 | Enke ................... H04W 12/069 |

(Continued)

FOREIGN PATENT DOCUMENTS

| CA | 3051219 A1 * | 2/2020 | ............. G06F 1/163 |
| EP | 2466926 A1 * | 6/2012 | |

OTHER PUBLICATIONS

Machine Translation of Chinese Patent Application CN 101401113 A, 2009. (Year: 2009).*

(Continued)

*Primary Examiner* — Steven G Snyder
(74) *Attorney, Agent, or Firm* — WPAT, PC

(57) ABSTRACT

A memory sharing electronic circuit system includes an external device, a transmission interface, and a host device, and allows the external device to store data in the host device. The external device performs a storage operation after receiving input data, wherein the storage operation includes: storing the input data in a device memory of the external device under a first condition; and encapsulating the input data into a data packet with a storage request under a second condition, and transmitting the data packet to the host device via the transmission interface. The host device performs a packet storage operation after receiving the data packet, wherein the packet storage operation includes: parsing the data packet with an Ethernet engine of the host device and thereby allowing the Ethernet engine to store the input data in a host memory of the host device according to the storage request of the data packet.

17 Claims, 10 Drawing Sheets

(56) References Cited

U.S. PATENT DOCUMENTS

| | | | |
|---|---|---|---|
| 11,422,700 B2* | 8/2022 | Lee | G06F 3/0683 |
| 11,489,640 B2 | 11/2022 | Chen | |
| 2008/0022026 A1* | 1/2008 | Yang | G06F 13/387 |
| | | | 710/200 |
| 2010/0161879 A1 | 6/2010 | Nation et al. | |
| 2014/0297905 A1* | 10/2014 | Wang | G06F 13/24 |
| | | | 710/48 |
| 2016/0099940 A1* | 4/2016 | Enke | H04L 63/0876 |
| | | | 726/4 |
| 2018/0183719 A1* | 6/2018 | Xie | H04L 65/80 |
| 2018/0205730 A1* | 7/2018 | Enke | H04W 12/069 |
| 2021/0117360 A1 | 4/2021 | Kutch et al. | |
| 2022/0188021 A1* | 6/2022 | Park | G06F 3/0688 |
| 2023/0091792 A1* | 3/2023 | Kanno | G06F 3/0679 |
| | | | 711/103 |

OTHER PUBLICATIONS

Machine Translation of Chinese Patent Application CN 116700593 A, 2023. (Year: 2023).*
IEEE Standard for Ethernet, 802.3-2012_section1_ch1-20_Chapter 3.1.1 Packet format(p. 107 of the PDF).
Index of relevant parts (annotated by inventor): 802.3-2012_section1_ch1-20_Chapter 3.1.1 Packet format(p. 107 of the PDF)(index of relevant pages)(annotated by inventor), Aug. 30, 2012, IEEE Computer Society.
OA letter of a counterpart TW application (appl. No. 111106072) mailed on Jan. 13, 2023.

* cited by examiner

MEMORY SHARING ELECTRONIC CIRCUIT SYSTEM AND EXTERNAL DEVICE CAPABLE OF STORING DATA IN HOST DEVICE

BACKGROUND OF THE INVENTION

1. Field of the Invention

The present disclosure relates to an electronic circuit system, especially to a memory sharing electronic circuit system.

2. Description of Related Art

An external device is usually equipped with a device memory having a small capacity, and thus its performance is usually limited to the small capacity. When the external device is attached to a host device via a transmission interface, even though the host device is equipped with a host memory having a large capacity, the host device may not allocate any part of the host memory to the external device based on the protocol of the transmission interface.

SUMMARY OF THE INVENTION

An object of the present disclosure is to provide a memory sharing electronic circuit system and an external device for the improvements over the prior art.

An embodiment of the memory sharing electronic circuit system of the present disclosure includes an external device, a transmission interface, and a host device. The external device is configured to perform a storage operation after receiving input data, wherein the storage operation includes: storing the input data in a device memory of the external device under a first condition; and encapsulating the input data into a data packet with a storage request under a second condition, and then transmitting the data packet to the host device via the transmission interface. The host device is configured to perform a packet storage operation after receiving the data packet, wherein the packet storage operation includes: parsing the data packet with an Ethernet engine of the host device and thereby allowing the Ethernet engine to store the input data in a host memory of the host device according to the storage request of the data packet. An embodiment of the Ethernet engine is an Ethernet integrated circuit, or is fulfilled by the host device executing a program.

An embodiment of the external device of the present disclosure can optionally store input data in a device memory of the external device or in a host memory of a host device. The external device is configured to perform a storage operation after receiving the input data, wherein the storage operation includes: storing the input data in the device memory under a first condition; and encapsulating the input data into a data packet with a storage request under a second condition, and then transmitting the data packet to the host device via a transmission interface. The external device is configured to perform a read operation after transmitting the data packet to the host device, wherein the read operation includes: encapsulating a read request into a null packet, and transmitting the null packet to the host device via the transmission interface. Each of the data packet and the null packet includes at least one of the following: an Ethernet Prefix (ETHP); an Internet Protocol (IP) header; a Transmission Control Protocol (TCP)/User Datagram Protocol (UDP) header; and a payload.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 5b shows an embodiment of the step S530 of FIG. 5a.

FIG. 5c shows an embodiment of the step S540 of FIG. 5a.

FIG. 5d shows an embodiment of the step S580 of FIG. 5a.

DETAILED DESCRIPTION OF THE PREFERRED EMBODIMENTS

The present specification discloses a memory sharing electronic circuit system and an external device. The system allows the external device to store data in a host device of the system under a certain condition so as to extend the storage capacity for the external device and improve the performance of the external device. The external device can optionally store data in the external device or in the host device.

Figure 1:
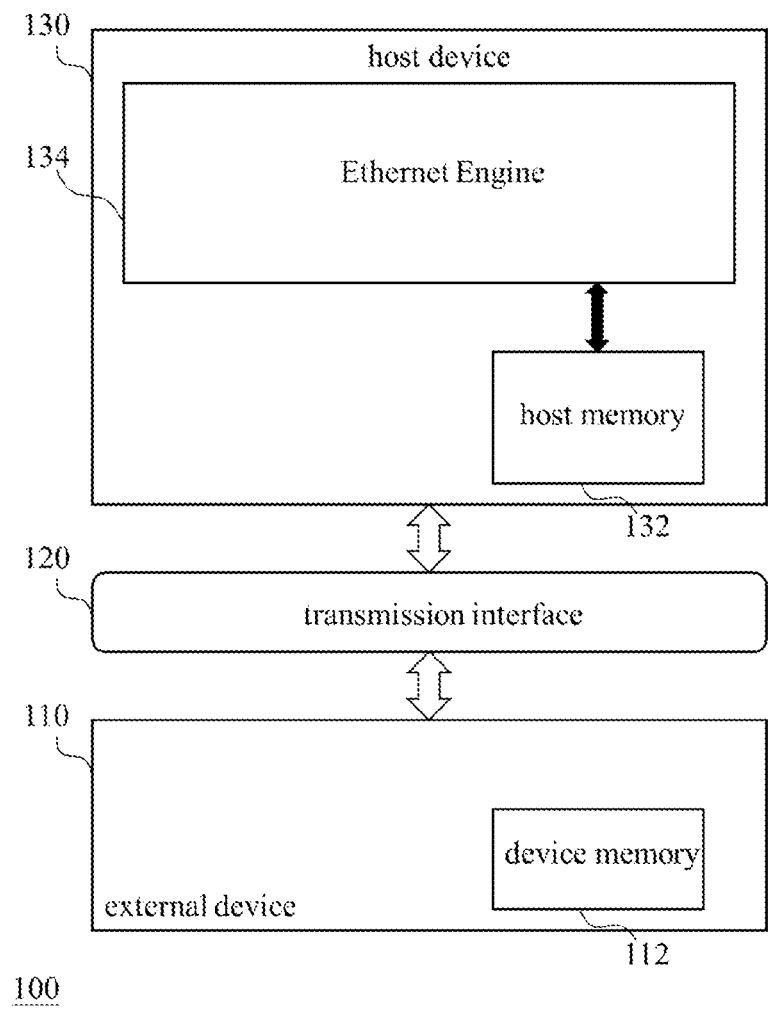
FIG. 1 shows an embodiment of the memory sharing electronic circuit system of the present disclosure.

FIG. 1 shows an embodiment of the memory sharing electronic circuit system of the present disclosure. The memory sharing electronic circuit system 100 of FIG. 1 includes an external device 110, a transmission interface 120, and a host device 130. An embodiment of the external device 110 is a wireless network integrated circuit (WiFi IC) including a device memory 112 which is usually an expensive static random access memory (SRAM) having a small capacity instead of a cost-effective dynamic random access memory (DRAM) having a large capacity. The transmission interface 120 is a physical interface such as an Ethernet interface, a data transmission interface, or a control interface. An embodiment of the Ethernet interface is one of the following: a Reduced Gigabit Media Independent Interface (RGMII); a Gigabit Media Independent Interface (GMII); a Media Independent Interface (MII); a High-Serial Gigabit Media Independent Interface (HSGMII); and an XFI interface (i.e., a high speed electrical interface of an XFP (10 Gigabit Small Form Factor Pluggable) optical module). An embodiment of the transmission interface 120 is one of the following: a Peripheral Component Interconnect Express (PCIe) interface; a Universal Serial Bus (USB) interface; and a Secure digital input/output (SDIO) interface. An embodiment of the control interface is one of the following: a Serial Management Interface (SMI); and an Inter-Integrated Circuit (I2C) interface. The host device 130 can be a system on a chip (SoC) or an electronic circuit system capable of multiple functions, and includes a host memory 132 and an Ethernet engine 134. It is noted that the external device 110 can cooperate with other kinds of host devices while the host device 130 can cooperate with other kinds of external devices, if practicable; in other words, the external device 100 and the host device 130 can be implemented separately. It is also noted that the external device 110 and the host device 130 have their respective interface circuits for cooperating with the transmission interface 120, but the interface circuits fall beyond the scope of the present disclosure.

In regard to the embodiment of FIG. 1, the external device 110 is configured to perform a storage operation after receiving input data. The storage operation includes: storing the input data in a device memory 112 (e.g., SRAM) of the external device 110 under a first condition; and encapsulating the input data into a data packet with a storage request under a second condition, and then transmitting the data packet to the host device 130 via the transmission interface 120. An example of the second condition includes at least one of the following: a condition that the device memory 112 has a remaining capacity insufficient for storing the input data, or the remaining capacity is less than a predetermined capacity; and a condition that the input data have not been forwarded to a target device (e.g., a wireless access point) (not shown in FIG. 1) yet because this forwarding operation waits for the accomplishment of a certain condition (e.g., a condition that the external device 110 receives other data or a read request), wherein the target device is any device except for the host device 130. An example of the first condition is a condition except for the second condition; in other words, the first condition and the second condition are mutually exclusive. It is noted that the external device 110 can optionally include a memory management circuit (not shown in FIG. 1) for storing the input data in the device memory 112; the external device 110 can optionally include a data processing circuit (e.g., a digital signal processor) (not shown in FIG. 1) for encapsulating the input data into the data packet with the storage request; and each of the memory management circuit and the data processing circuit can be realized with known/self-developed technologies.

In an exemplary implementation, the aforementioned data packet includes an Ethernet label as the storage request. An example of the Ethernet label is one of the following: an Ethernet Prefix (ETHP); an Internet Protocol (IP) header; a Transmission Control Protocol (TCP)/User Datagram Protocol (UDP) header; and a payload. In an exemplary implementation, the Ethernet label includes a buffer identifier (BID); the BID is in connection with a physical memory address of a storage space of the host memory 132 (e.g., DRAM) and used for notifying the host device 130 that the data packet is for this storage space; and the external device 110 maintains and updates an associative table (not shown in FIG. 1) which indicates the connection between the BID and the input data included in the data packet. In an exemplary implementation, the Ethernet label includes an operational command (hereinafter referred to as "the OP"); the OP is used for requesting the host device 130 to store/read/delete the storage data. In an exemplary implementation, the Ethernet label is an ETHP which includes a plurality of fields including a destination address (DA) field, a source address (SA) field, an EtherType field, an OP field, and a BID field, wherein the OP field and the BID field are filled with the above-mentioned OP and BID respectively, and the other fields are common in the Ethernet technical field.

Figure 2:
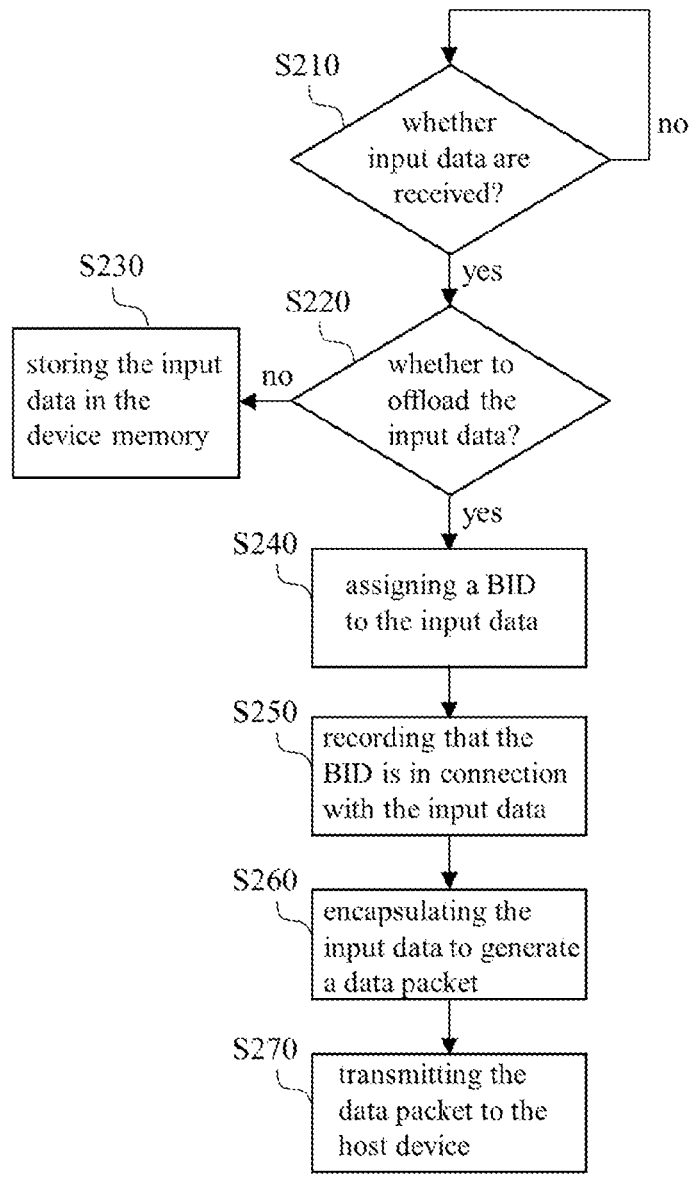
FIG. 2 shows an embodiment of the storage operation performed by the external device of FIG. 1.

FIG. 2 shows an embodiment of the aforementioned storage operation performed by the external device 110. FIG. 2 includes the following steps:
S210: determining whether input data are received; if so, going to S220; and if not, repeating S210.
S220: determining whether to offload the input data; if so, going to S240; and if not, going to S230.
S230: storing the input data in the device memory 112, and going back to S210 or ending the storage operation.
S240: assigning a BID to the input data, wherein the BID is free before this assignment.
S250: updating the associative table to record that the BID is in connection with the input data.
S260: encapsulating the input data to generate a data packet including an ETHP which includes the BID and an OP.
S270: transmitting the data packet to the host device 130.

Figure 3:
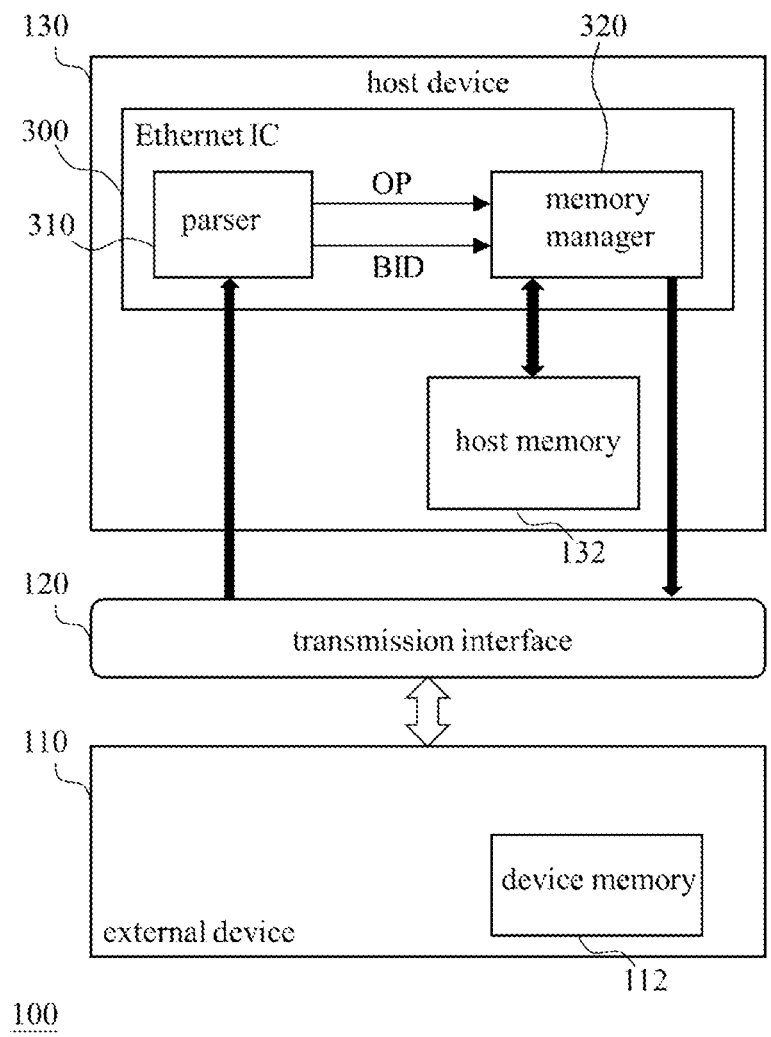
FIG. 3 shows an embodiment of the Ethernet engine of the host device of FIG. 1.

In regard to the embodiment of FIG. 1, the host device 130 is configured to perform a packet storage operation after receiving the data packet from the external device 110 via the transmission interface 120. The packet storage operation includes: parsing the data packet with the Ethernet engine 134 and thereby allowing the Ethernet engine 134 to store the input data in the host memory 132 according to the storage request of the data packet, wherein the total storage capacity of the host memory 132 is usually much greater than the total storage capacity of the device memory 112, and a storage capacity (e.g., 4096 memory pages, wherein the size of each memory page can be determined according to the demand for implementation) of the host memory 132 allocated to the external device 110 can be greater than, equal to, or less than the total capacity of the device memory 112. An embodiment of the Ethernet engine 134 is an Ethernet IC 300 as shown in FIG. 3, and includes a parser 310 and a memory manager 320; the parser 310 is configured to parse the data packet; the memory manager 320 is configured to store the input data in the host memory 132 according to the storage request including the BID and OP; and the host memory 132 can be outside the Ethernet IC 300 or integrated into the Ethernet IC 300. Another embodiment of the Ethernet engine 134 is fulfilled by the host device 130 executing a program; the content of the program can be derived with common software/firmware development technologies based on the present disclosure. It is noted that if the transmission interface 120 is an Ethernet interface, the Ethernet engine 134 receives the data packet from the transmission interface 120; and if the transmission interface 120 is not an Ethernet interface, the transmission interface 120 can transmit the data packet to a central processing unit (CPU) (not shown in FIG. 1) of the host device 130, and the CPU can determine that the destination of the data packet is Ethernet engine 134 and then forward the data packet to the Ethernet engine 134.

Figure 4:
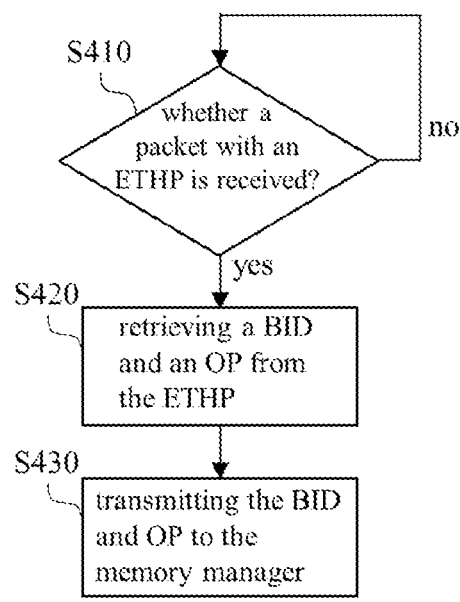
FIG. 4 shows an embodiment of how the Ethernet engine of the host device of FIG. 1 parses a packet.

FIG. 4 shows an embodiment of how the Ethernet engine 134 of FIG. 1 parses a packet. As shown in FIG. 4, after the Ethernet engine 134 receives a packet (e.g., the aforementioned data packet, or the null packet mentioned in the later paragraphs) with an ETHP, a parser (e.g., the parser 310 of FIG. 3) of the Ethernet engine 134 retrieves the BID and OP of the ETHP and forwards the BID and OP to the memory manager (e.g., the memory manager 320 of FIG. 3) of the Ethernet engine 134 for further operation. If the packet is a data packet carrying the input data, the parser forwards the input data to the memory manager as well. To be more specific, FIG. 4 includes the following steps:

S410: determining whether a packet with an ETHP is received; if so, going to S420; and if not, repeating S410.

S420: retrieving a BID and an OP from the ETHP.

S430: transmitting the BID and OP to the memory manager.

Figure 5A:
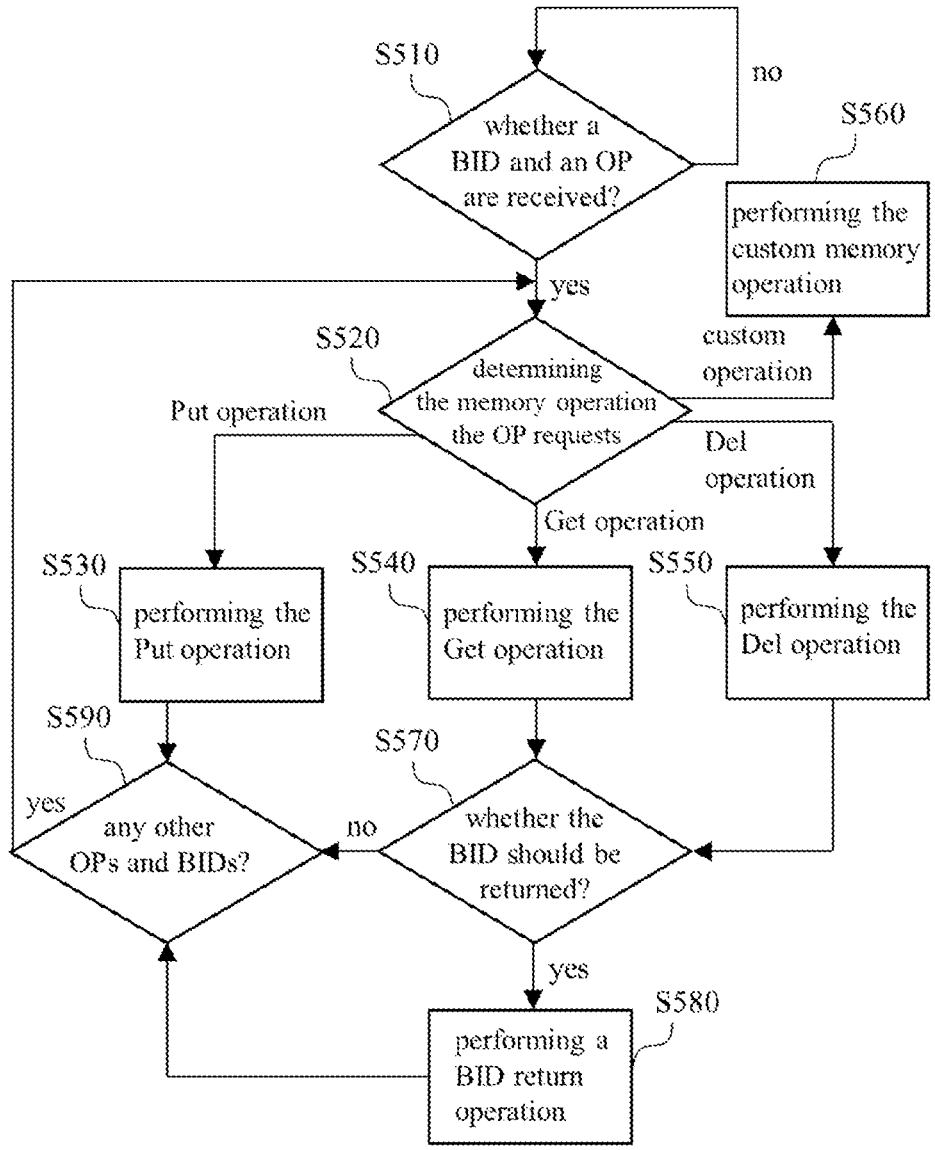
FIG. 5a shows an embodiment of how the Ethernet engine of the host device of FIG. 1 stores data, reads data, and deletes data.

FIG. 5a shows an embodiment of how the Ethernet engine 134 of FIG. 1 stores data, reads data, and deletes data according to the aforementioned BID and OP. As shown in FIG. 5a, after receiving the BID, OP, and input data from the parser of the Ethernet engine 134, the memory manager of the Ethernet engine 134 performs a memory operation according to the OP. Different kinds of OPs request different kinds of memory operations as described below:

(1) If the OP requests a data storage operation (hereinafter referred to as "the Put operation"), the memory manager refers to a mapping table (not shown in the Figures) including the connections between BIDs and physical memory addresses and thereby ascertains which physical memory address is in connection with the BID, then writes the input data into a storage space having the physical memory address in connection with the BID, and then classifies the physical memory address under "valid".

(2) If the OP requests a data read operation (hereinafter referred to as "the Get operation"), the memory manager refers to the mapping table to ascertain which physical memory address is connection with the BID, then reads data from a storage space having the physical memory address in connection with the BID, and then classifies the physical memory address under "invalid"; afterward, the memory manager recycles the BID with a BID recycle buffer. It is noted that after the amount of the recycled BIDs in the BID recycle buffer reaches a predetermined amount (or after the remaining capacity of the BID recycle buffer is less than a predetermined capacity), the memory manager generates a notification such as an Ethernet packet including the recycled BIDs and/or the information thereof, and sends the notification to the external device 110 for the reuse of these BIDs.

(3) If the OP requests a data delete operation (hereinafter referred to as "the Del operation"), the memory manager refers to the mapping table to ascertain which physical memory address is connection with the BID, then classifies the physical memory address in connection with the BID under "invalid", and then recycles the BID with the BID recycle buffer.

(4) If the OP requests a custom operation, the memory manager performs a custom memory operation according to the OP.

To be more specific, FIG. 5a includes the following steps:

S510: determining whether a BID and an OP are received from the parser of the Ethernet engine 134; if so, going to S520; if not, repeating S510.

S520: determining the memory operation that the OP requests; if the OP requests a Put operation, going to S530; if the OP requests a Get operation, going to S540; if the OP requests a Del operation, going to S550; and if the OP requests a custom operation, going to S560.

Figure 5B:
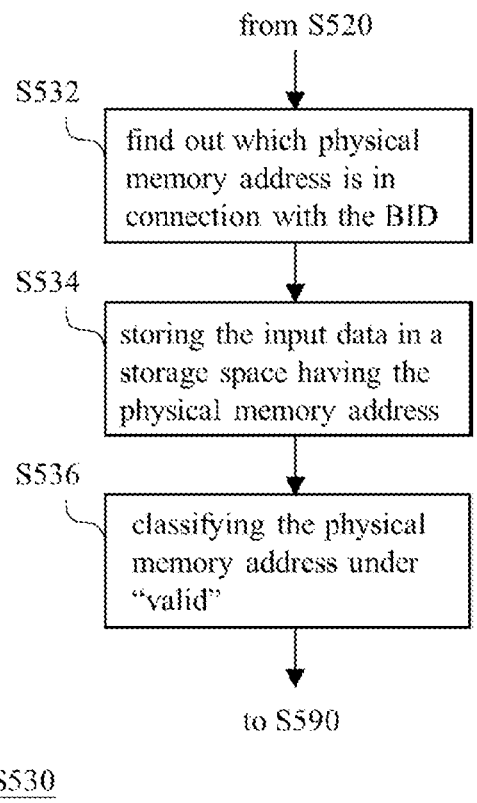

S530: performing the Put operation. An embodiment of the Put operation is illustrated with FIG. 5b, and includes:

S532: referring to the mapping table to find out which physical memory address is in connection with the BID;

S534: storing the input data in a storage space having the physical memory address in connection with the BID; and S536: classifying the physical memory address under "valid" and then going to S590.

Figure 5C:
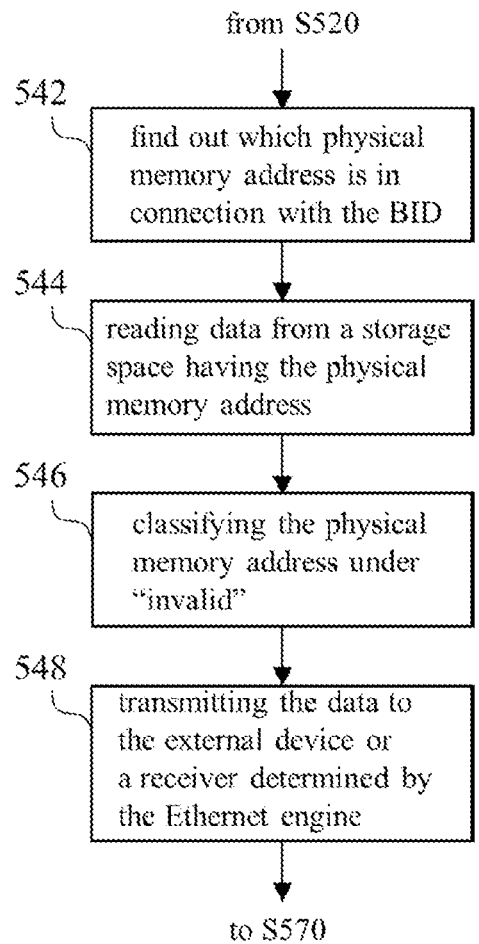

S540: performing the Get operation. An embodiment of the Get operation is illustrated with FIG. 5c, and includes:

S542: referring to the mapping table to find out which physical memory address is in connection with the BID;

S544: reading data from a storage space having the physical memory address in connection with the BID;

S546: classifying the physical memory address under "invalid"; and

S548: transmitting the data to the external device 110, or transmitting the data to a receiver (e.g., the CPU of the host device 130, or some Ethernet device) determined by the Ethernet engine 134; and then going to S570.

S550: performing the Del operation including: referring to the mapping table to ascertain which physical memory address is in connection with the BID, then classifying the physical memory address in connection with the BID under "invalid", and then going to S570.

S560: performing the custom memory operation. For example, the custom memory operation is one of the following:

(1) a burst read operation reading data from multiple successive memory addresses/pages;

(2) a partial read operation for reading partial data from a storage space of the host memory 132, wherein the OP carries offset and length information to allow the memory manager to read the partial data from the storage space (e.g., the aforementioned memory page) according to the offset and length information;

(3) a data copy/transfer operation, wherein the ETHP carries a source BID and a destination BID, the memory manger copies/transfers data in a storage space in connection with the source BID to a storage space in connection with the destination BID; and (4) an arithmetic operation (e.g., an addition operation while the ETHP carries at least three BIDs and the memory manger adds up data stored in storage spaces in connection with the first and second BIDs of the three BIDs to generate summation data, and then stores the summation data in a storage space in connection with the third BID of the three BIDs).

S570: determining whether the BID should be returned to the external device 110; if so, going to S580; and if not, going to S590.

Figure 5D:
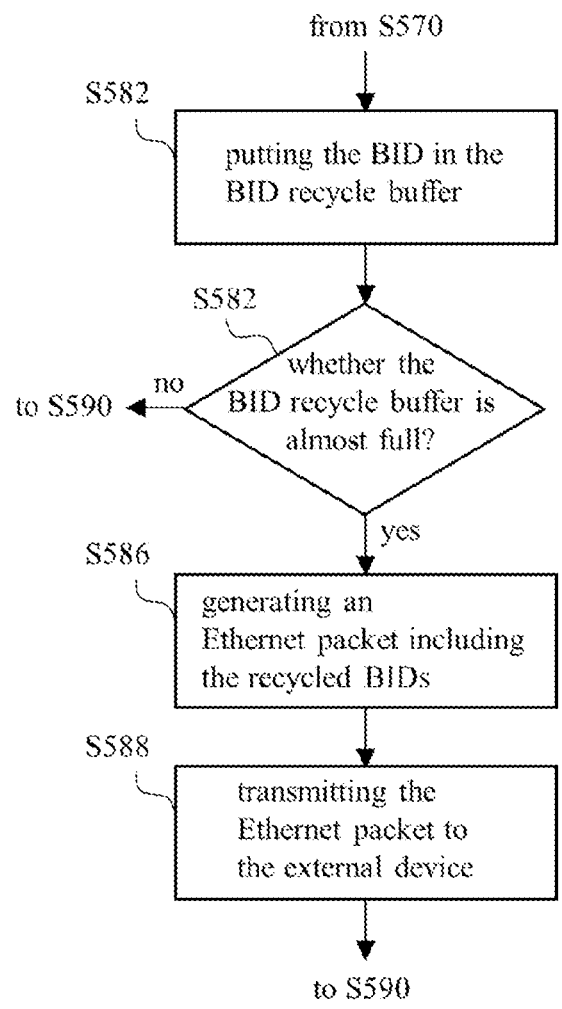

S580: performing a BID return operation. An embodiment of the BID return operation is illustrated with FIG. 5d, and includes:

S582: putting the BID in the BID recycle buffer;

S584: determining whether the amount of the recycled BIDs in the BID recycle buffer reaches the predetermined amount, that is to say determining whether the BID recycle buffer is almost full; if so, going to S586; and if not, going to S590;

S586: generating an Ethernet packet including the recycled BIDs and/or the information thereof; and S588: transmitting the Ethernet packet to the external device 110.

S590: determining whether any other OPs and BIDs need to be processed; if so, going back to S520; and if not, ending the flow of FIG. 5a.

Figure 6:
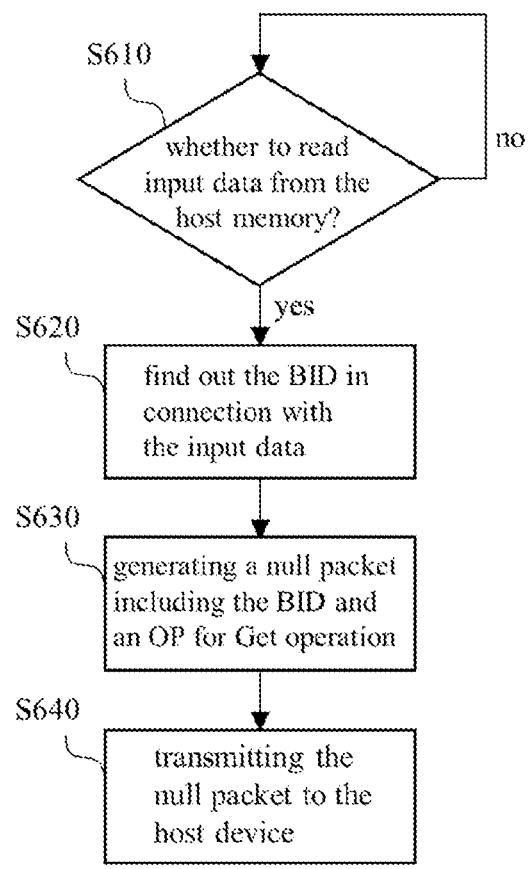
FIG. 6 shows an embodiment of the read operation performed by the external device of FIG. 1.

In regard to the embodiment of FIG. 1, after storing the input data in the host device 130, the external device 110 can perform a read operation when it needs the input data. The read operation includes: encapsulating a read request into a null packet; and transmitting the null packet to the host device 130 via the transmission interface 120. FIG. 6 shows an embodiment of the read operation. In regard to the embodiment of FIG. 6, the external device 110 firstly refers to the aforementioned associative table to put both the BID in connection with the input data and an OP (i.e., an OP requesting the aforementioned Get operation) in an ETHP; then the external device 110 generates a null packet including the ETHP and padding; and then the external device 110 transmits the null packet to the host device 130. More specifically, the embodiment of FIG. 6 includes the following steps:

S610: determining whether to read the input data from the host memory 132; if so, going to S620; if not, repeating S610.

S620: referring to the associative table to find out the BID in connection with the input data.

S630: putting the BID and an OP requesting a Get operation in an ETHP, and thereby generating a null packet including the ETHP.

S640: transmitting the null packet to the host device 130.

On the basis of the description of FIG. 6, the host device 130 performs a packet read operation after receiving the null packet. The packet read operation includes: parsing the null packet with the Ethernet engine 134 to obtain the read request; and then making the Ethernet engine 134 transmit the input data stored in the host memory 132 to the external device 110 via the transmission interface 120 in accordance with the read request, or making the Ethernet engine 134 transmit the input data to a receiver determined by the Ethernet engine 134. An embodiment of the packet read operation is illustrated with FIG. 5c.

Figure 7:
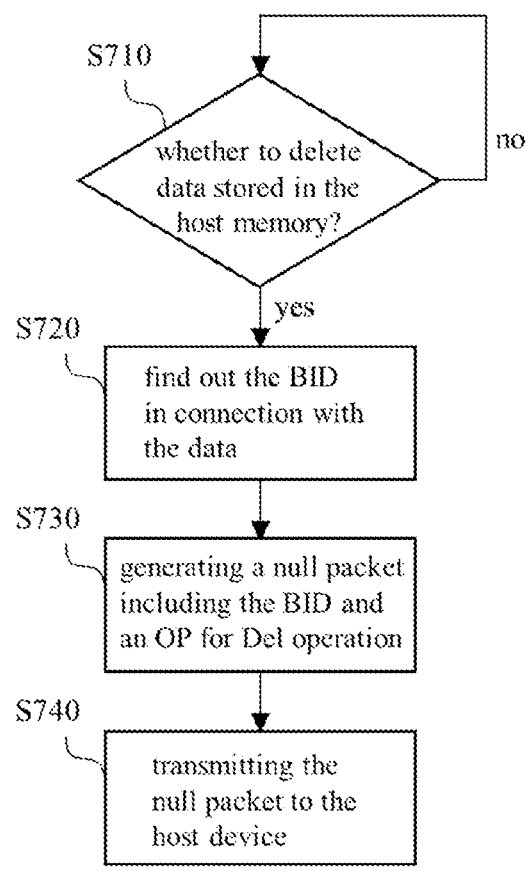
FIG. 7 shows an embodiment of the delete operation performed by the external device of FIG. 1.

In regard to the embodiment of FIG. 1, after storing the input data in the host device 130, the external device 100 can perform a delete operation when it doesn't need the input data stored in the host device 130. The delete operation includes: encapsulating a delete request into a null packet; and transmitting the null packet to the host device 130 via the transmission interface 120. FIG. 7 shows an embodiment of the delete operation. In regard to the embodiment of FIG. 7, the external device 110 firstly refers to the aforementioned associative table to put both the BID in connection with the input data and an OP (i.e., an OP requesting the aforementioned Del operation) in an ETHP; then the external device 110 generates a null packet including the ETHP and padding; and then the external device 110 transmits the null packet to the host device 130. More specifically, the embodiment of FIG. 7 includes the following steps:

S710: determining whether to delete the input data stored in the host memory 132; if so, going to S720; if not, repeating S710.

S720: referring to the associative table to find out the BID in connection with the input data.

S730: putting the BID and an OP requesting a Del operation in an ETHP, and thereby generating a null packet including the ETHP.

S740: transmitting the null packet to the host device 130.

On the basis of the description of FIG. 7, after receiving the null packet, the host device 130 performs a packet delete operation including: parsing the null packet with the Ethernet engine 134 obtain the delete request; and then making the Ethernet engine 134 delete the input data stored in the host memory 132 in accordance with the delete request. An embodiment of the packet delete operation is the step S550 of FIG. 5a.

The aforementioned embodiments can be modified according to the demand for implementation. For example, each of the following features can optionally be introduced to any of the embodiments:

(1) on condition that the storage request (e.g., ETHP, IP header, TCP/UDP header, or payload) includes an OP without any BID, the Ethernet engine 134 storing the input data in the host memory 132 in a first-in first-out manner.

(2) on condition that the storage/read request includes a BID without any OP, the memory manager referring to the state of the BID to determine which kind of memory operations should be performed; if the state of the BID is "invalid", the memory manager performing the Put operation; and if the state of the BID is "valid", the memory manager performing the Get operation.

(3) on condition that the mapping table of the host device 130 is omitted, the external device 110 generating the storage/read/delete request (e.g., ETHP, IP header, TCP/UDP header, or payload) with a physical memory address.

(4) on condition that the external device 110 takes charge of all BIDs assigned to the external device 110 by the host device 130, the memory manager of the Ethernet engine 134 having no need to return free BIDs to the external device 110.

(5) the BID and the OP for the same operation (e.g., the Put/Get/Del operation) being transmitted to the host device 130 separately. For example, the external device 110 generates two packets including the BID and the OP respectively, and transmits the two packets to the host device 130 respectively.

(6) the host memory 132 being a DRAM, a SRAM, a flash memory, or any memory (e.g., an external USB hard drive or a network attached storage (NAS) device) that can be controlled by the host device 130.

(7) the input data being a network packet or any data such as image data (e.g., data generated by a digital camera) or sensor data, wherein when the input data is not a network packet, it can be included in the payload and then transmitted to the host device 130.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention can be flexible based on the present disclosure.

To sum up, the memory sharing electronic circuit system of the present disclosure allows the external device to store data in the host device under the second condition so as to extend the storage capacity for the external device and improve the performance of the external device; and the external device of the present disclosure can store data in the device memory of the external device under the first condition and store data in the host memory of the host device under the second condition.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A memory sharing electronic circuit system comprising:
   a wireless network integrated circuit (wireless network IC), having a device memory with a remaining capacity, the wireless network IC configured to communicate with a wireless access point (wireless AP);
   a physical transmission interface, connected to the wireless network IC; and
   a host device, having a host memory, the host device connected to the physical transmission interface;
   wherein:
      the wireless network IC receives input data for communicating with the wireless AP; and
      the wireless network IC performs storing the input data in the device memory, or, offloading the input data when the wireless IC is not ready to forward the input data, the offloading the input data including:
         the wireless network IC encapsulating the input data into a data packet with a storage request, and transmitting the data packet to the host device via the physical transmission interface; and
         the host device performing a packet storage operation after receiving the data packet including parsing the data packet with an Ethernet engine of the host device causing the Ethernet engine to store the input data in the host memory of the host device according to the storage request of the data packet.

2. The memory sharing electronic circuit system of claim 1, wherein the data packet includes at least one of the following: an Ethernet Prefix (ETHP); an Internet Protocol (IP) header; a Transmission Control Protocol (TCP)/User Datagram Protocol (UDP) header; and a payload.

3. The memory sharing electronic circuit system of claim 1, wherein the data packet is an Ethernet packet, the physical transmission interface is an Ethernet interface, and the Ethernet engine is configured to receive the data packet from the physical transmission interface.

4. The memory sharing electronic circuit system of claim 1, wherein the physical transmission interface is not an Ethernet interface, the host device includes a central processing unit (CPU), and the CPU is configured to forward the data packet to the Ethernet engine.

5. The memory sharing electronic circuit system of claim 1, wherein the Ethernet engine is an Ethernet integrated circuit (Ethernet IC) including:
   a parser configured to parse the data packet; and
   a memory manager configured to store the input data in the host memory according to the storage request.

6. The memory sharing electronic circuit system of claim 1, wherein the host device executes a program to fulfill the Ethernet engine.

7. The memory sharing electronic circuit system of claim 1, wherein the storage request includes a buffer identifier (BID); the BID is in connection with a storage space of the host memory; and the Ethernet engine parses the data packet to obtain the BID, and then stores the input data in the storage space according to the BID.

8. The memory sharing electronic circuit system of claim 7, wherein the Ethernet engine includes a mapping table; the mapping table indicates that the BID is in connection with the storage space; and the Ethernet engine stores the input data in the storage space according to the BID and the mapping table.

9. The memory sharing electronic circuit system of claim 7, wherein the wireless network IC includes an associative table; the associative table indicates usage states of multiple buffer identifiers (multiple BIDs); and the multiple BIDs are predetermined or assigned by the host device, and include the BID.

10. The memory sharing electronic circuit system of claim 1, wherein the storage request does not include a buffer identifier (BID); and the Ethernet engine stores the input data in the host memory in a first-in first-out manner.

11. The memory sharing electronic circuit system of claim 1, wherein the storage request includes an operational command; and when the operational command is a storage command, the Ethernet engine stores the input data in the host memory according to the storage command.

12. The memory sharing electronic circuit system of claim 1, wherein:
   the wireless network IC is further configured to perform a read operation, the read operation including:
      encapsulating a read request into a null packet, and transmitting the null packet to the host device via the physical transmission interface; and
   the host device is further configured to perform a packet read operation after receiving the null packet, the packet read operation including:
      parsing the null packet with the Ethernet engine to make the Ethernet engine transmit the input data stored in the host memory to the wireless network IC via the physical transmission interface in accordance with the read request, or to make the Ethernet engine transmit the input data to a receiver determined by the Ethernet engine.

13. The memory sharing electronic circuit system of claim 12, wherein the read request includes a buffer identifier (BID); the BID is in connection with a storage space of the host memory; the Ethernet engine parses the null packet to obtain the BID; and the Ethernet engine reads out the input data of the storage space according to the BID, and transmits the input data to the wireless network IC via the physical transmission interface or transmits the input data to the receiver determined by the Ethernet engine.

14. The memory sharing electronic circuit system of claim 13, wherein the Ethernet engine transmits the input data to the wireless network IC via the physical transmission interface; and after transmitting the input data to the wireless network IC, the Ethernet engine transmits a notification to the wireless network IC via the physical transmission interface and thereby notifies the wireless network IC that the BID is free.

15. The memory sharing electronic circuit system of claim 12, wherein the read request does not include a buffer identifier; and the Ethernet engine transmits the input data stored in the host memory to the wireless network IC via the physical transmission interface in a first-in first-out manner.

16. The memory sharing electronic circuit system of claim 12, wherein the read request includes an operational command; and when the operational command is a read command, the Ethernet engine transmits the input data stored in the host memory to the wireless network IC via the physical transmission interface in accordance with the operational command.

17. The memory sharing electronic circuit system of claim 1, wherein:

the wireless network IC is further configured to perform a delete operation, the delete operation including:
  encapsulating a delete request into a null packet, and transmitting the null packet to the host device via the physical transmission interface; and
the host device is further configured to perform a packet delete operation after receiving the null packet, the packet delete operation including:
  parsing the null packet with the Ethernet engine to make the Ethernet engine delete the input data stored in the host memory in accordance with the delete request.

* * * * *